E. MAY.
OTACOUSTIC.
APPLICATION FILED AUG. 26, 1909.
951,195.
Patented Mar. 8, 1910.
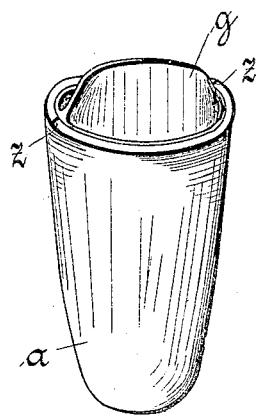
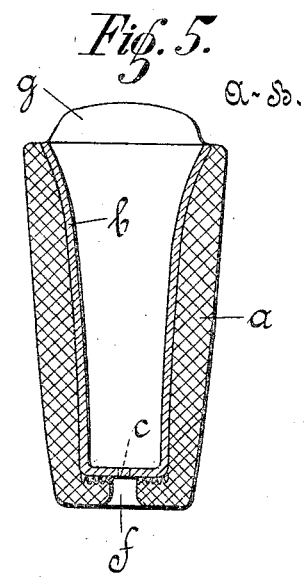
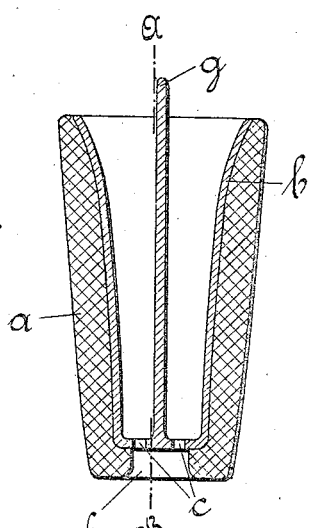
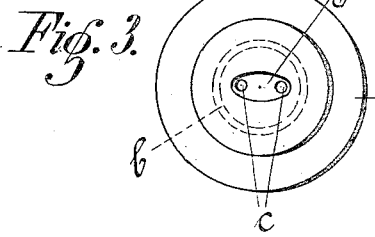
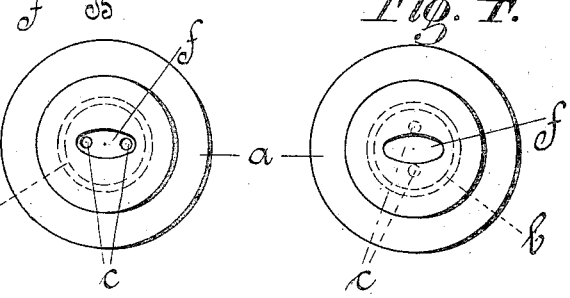
Witnesses:
W. R. Schulz
Edward H. Schorr.
Inventor:
Ernst May
by his attorney
Frank O. Briesen

UNITED STATES PATENT OFFICE.

ERNST MAY, OF DUSSELDORF, GERMANY.

OTACOUSTIC.

951,195.  Specification of Letters Patent.  Patented Mar. 8, 1910.

Application filed August 26, 1909. Serial No. 514,694.

*To all whom it may concern:*

Be it known that I, ERNST MAY, a citizen of Germany, residing at Dusseldorf, Germany, have invented new and useful Improvements in Otacoustics, of which the following is a specification.

This invention relates to an otacoustic adapted to be inserted into the ear and which is so constructed that it may be readily set to either exclude or admit the sound waves.

In the accompanying drawing: Figure 1 is a perspective view of my improved otacoustic; Fig. 2 is a longitudinal section thereof, showing the sound apertures open; Fig. 3 a plan of Fig. 2; Fig. 4 a similar view, showing the sound apertures closed, and Fig. 5 a longitudinal section on line A—B, Fig. 2.

The device comprises essentially a flaring metallic cup $b$, having a belled mouth adapted to collect the sound waves. Cup $b$, is divided into two compartments by a central partition having a handle $g$. Each of these compartments is provided at its bottom with a sound orifice $c$. Cup $b$, is rotatably seated within a cup-shaped rubber shell $a$, having a long and narrow bottom opening $f$. On its inner side the bottom of shell $a$, is provided with a suitable wiper, as shown.

When cup $b$, is so positioned that holes $c$, register with hole $f$, (Fig. 3), the sound waves are free to enter the ear, while, when cup $b$, is so turned by handle $g$, that holes $c$, extend at right angles to hole $f$, (Fig. 4), the sound waves are excluded. During this rotating movement, holes $c$, are cleaned by the wiper of shell $a$. A suitable index $z$, serves to readily ascertain the position of the cup.

I claim:

1. An otacoustic comprising an outer apertured shell, and an inner cup rotatable within the shell.

2. An otacoustic comprising an outer apertured shell, and an inner rotatable cup provided with a partition and an aperture at each side of said partition.

3. An otacoustic comprising an outer apertured shell having a wiper, and an inner rotatable cup provided with a partition and an aperture at each side of said partition.

Signed by me at Barmen, Germany, this 12th day of August, 1909.

ERNST MAY. [L. S.]

Witnesses:
 OTTO KÖNIG,
 PAUL MÜLLER.